Feb. 24, 1953  D. K. McILVAINE ET AL  2,629,826
CONTROLLER FOR LIQUID LEVEL OR THE LIKE
Filed Nov. 12, 1946  2 SHEETS—SHEET 2
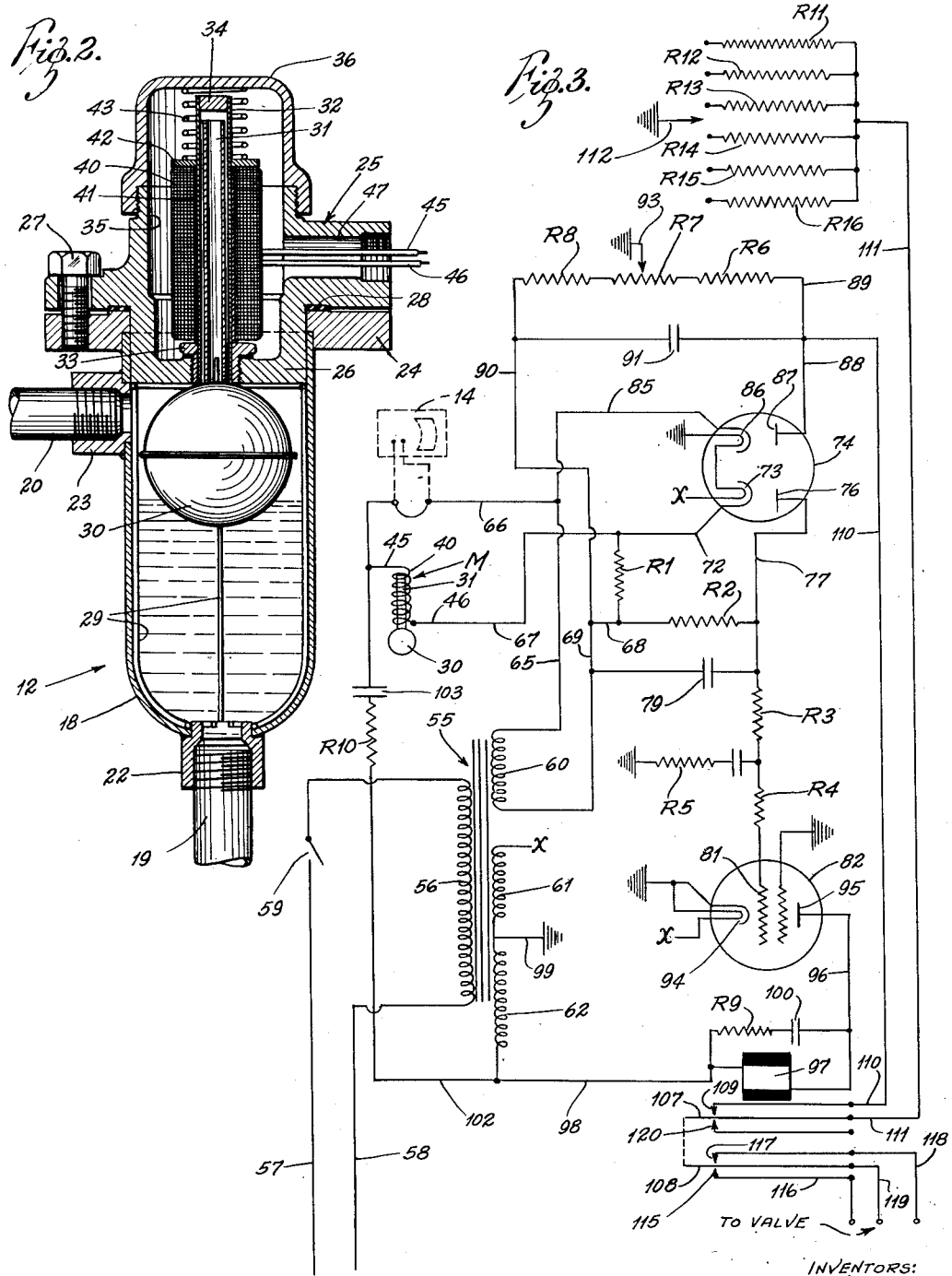
INVENTORS:
DOUGLAS K. McILVAINE,
WILLIAM P. MYERS, JR.
By Kingsland, Rogers & Ezell
ATTORNEYS.

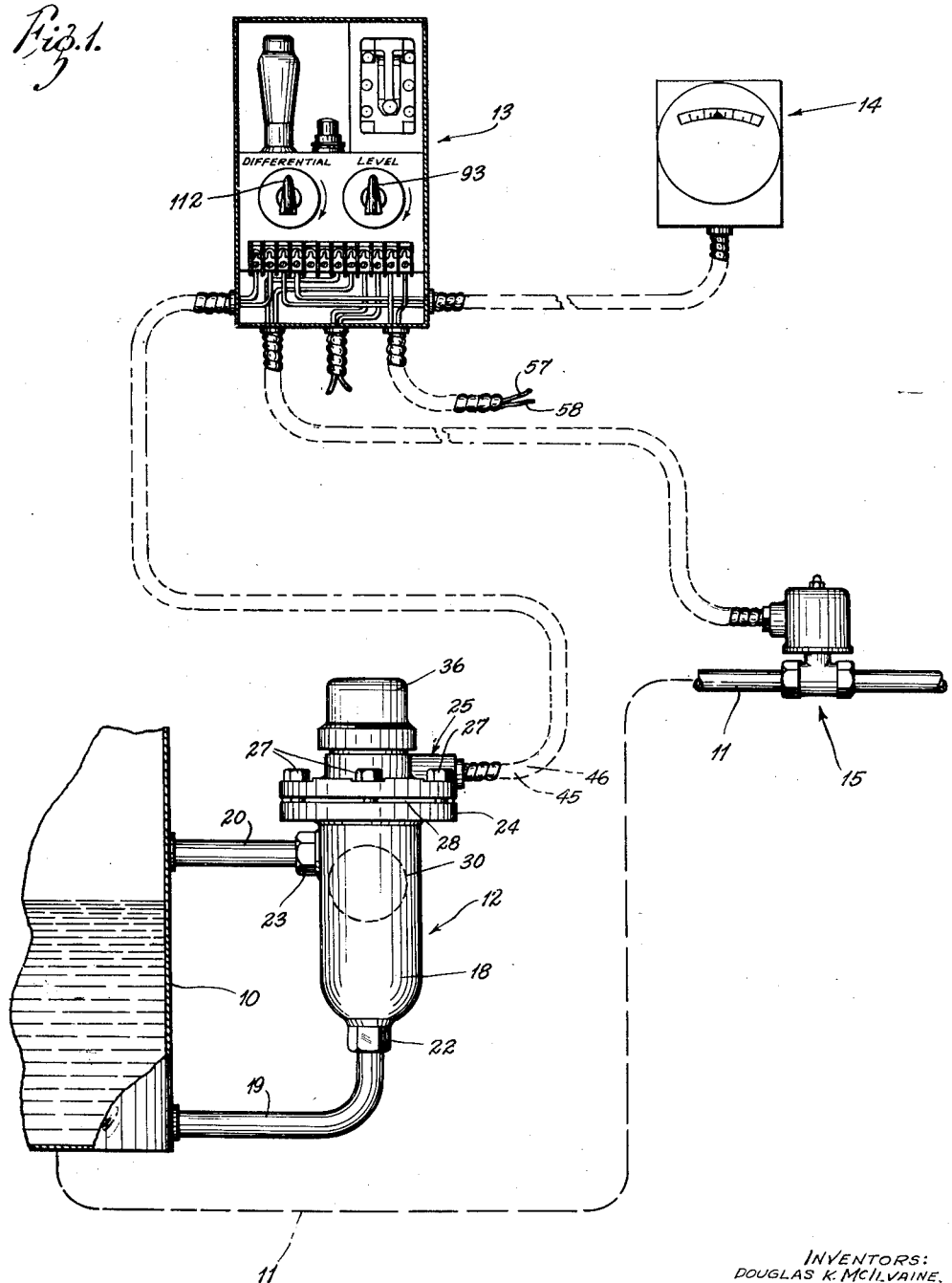

Patented Feb. 24, 1953

2,629,826

UNITED STATES PATENT OFFICE 2,629,826

CONTROLLER FOR LIQUID LEVEL OR THE LIKE

Douglas K. McIlvaine, Des Plaines, Ill., and William P. Myers, Jr., Webster Groves, Mo., assignors to Alco Valve Company, University City, Mo., a corporation of Missouri Application November 12, 1946, Serial No. 709,134

12 Claims. (Cl. 250—27)

The present invention relates to a controller for liquid level, or the like. In general, this mechanism includes a sensitive element connected into an electronic circuit, which sensitive element responds to changes in the given external situation, and translates these changes into changes in the output of an electronic circuit. The present disclosure exemplifies the sensitive element as one responding to changes in liquid level, the illustrations specifically showing a float, which float operates an armature that moves with respect to a magnetic core in a characterized manner and thereby changes the impedance of a coil as a function of the elevation of the float. The coil, in turn, is connected into an electronic circuit in a particular manner, so that the changes in grid potential on a tube in the circuit are functions of the position of the float. These changes in grid potential are reflected in the output circuit of the tube, which output circuit may be employed to operate a valve controlling liquid flow from a tank, or the like, the liquid level in which regulates the position of the float. It will be understood that external means other than a float may be used to operate the sensitive element, and means other than a valve may be ultimately operated off of the output circuit.

It is an object of the invention to provide a characterized magnetic solenoid coil and armature combination for the purpose of varying the impedance of an electrical circuit, wherein a given amount of movement of the armature may always produce the final operation or inoperation of the output circuit, regardless of where such increment of movement is disposed in the over-all path of movement of the armature.

It is a further object of the invention to provide a mechanism and electrical circuit of the foregoing kind including an electronic tube so arranged as to render the tube conductive or non-conductive in accordance with variations in the position of the armature element, which mechanism is operated without resorting to oscillatory, resonant, or bridge network arrangements.

A further object of the invention is to provide a mechanism as aforesaid, together with means for setting the control point for operation of the output circuit at any place within the working range of the armature.

A further object of the invention is to provide a control as aforesaid having means for varying the magnitude of the uniform increments of armature movement necessary to cause the output circuit to become operative or inoperative, and vice versa. More particularly, it is an object to provide the aforesaid operation wherein the magnitude of the increments of armature movement may be varied to cause an electronic tube to become conducting or non-conducting, and vice versa.

A particular object is to provide a controller as aforesaid in which the operation of the load switch or relay may be altered by means remote from the sensitive or governing element. In particular, it is an object to provide a control as aforesaid in which a control point of an output circuit from an electronic tube may be calibrated by one means, that may be an internal means within the mechanism, and may be adjusted by another means, which can be arranged externally and separately from the remainder of the circuit. Specifically, it is an object of the invention to provide an output controlled mechanism, operated as a result of operation of the output side of an electronic mechanism of the foregoing type, which changes the control point of the electronic tube, so that it is different when the output circuit is operative from what it is when the said output circuit is inoperative.

It is a further object to provide a control as aforesaid which gives a maximum freedom from the effects of supply voltage variation. A particular object is to provide an electrical control as aforesaid having a combination of resistors, capacitors and electronic tubes energized from a common source and so connected to an electronic output tube as to provide the maximum freedom from the effects of supply voltage variation.

In the drawings:

Fig. 1 is a more or less diagrammatic view of the principal elements of this invention;

Fig. 2 is a vertical section through the sensitive element; and

Fig. 3 is a wiring diagram of the control mechanism.

As shown in Fig. 1, there is a liquid level tank 10. This tank is supplied with liquid through a pipe 11. The invention is here applied to a means for maintaining the liquid level in the tank 10 within prescribed limits. To this end, there is a sensitive mechanism, generally indicated at 12 and comprising a float device, as will appear, a control, generally indicated at 13, an indicator 14, and a valve 15 which may be of the electromagnetic type.

The sensitive element comprises a liquid container 18 connected by a lower pipe 19 and an upper pipe 20 with the tank 10. By this arrangement, the container 18 receives liquid at the level of the tank. It will appear that the mechanism 12 will respond to the liquid level in the tank. The liquid level in the container 18 may vary within a range determined by the depth of this container, and this range is the range of adjustment of the mechanism.

As shown in Fig. 2, the container 18 is bowl-shaped and has a fitting 22 at its bottom, by means of which the pipe 19 may be connected into it. It likewise has a fitting 23 adjacent its upper edge, by means of which the pipe 20 may be connected into it. At its top, it has a flange 24 integrally attached to it, as by welding, or the like. This receives a cap member, generally indicated at 25 and having a depending portion 26 that fits closely down into the top of the bowl 18. The cap member 25 is removably secured to the bowl member by screws 27 that interengage between the flanges thereof. A suitable gasket 28 affords a seal between these members.

Within the bowl, there is a wire-like frame 29 that furnishes a guide means for a float 30, and this guide means or framework 29 minimizes friction of the float.

The float gives vertical movement to an armature 31, which is here shown as a cylindrical tube constructed of magnetic material. The armature 31 is guided in an enclosing tube 32 of non-magnetic material, which tube 32 is attached to a fitting 33 that is threaded into the bottom wall of the cap 36 and affords a seal. The top of the tube 32 is enclosed by a plug 34. By this means, the float chamber is in communication with the interior of the tube 32, but is sealed away from an interior coil chamber 35 formed within the cap member 25 and a top cover 36 that is screwed onto the top of the cap member 25.

Within the coil chamber 35, there is a coil 40 that is wound about a sleeve 41 and inserted over the tube 32. A washer disc 42 fits against the top of the coil assembly and is urged downwardly by a coil spring 43 that abuts against the inner part of the top cover 36. The coil is provided with two leads 45 and 46 that pass out through a suitable opening 47 in the side of the cap member 25, which opening is threaded to receive a conduit fitting, as desired.

The armature 31 and coil 40 are characterized to produce uniform operational sensitivity. That is to say, a given increment of vertical movement of the armature will produce a given increment of change in impedance in the coil 40, regardless of what vertical position the armature occupies at the start of such given increment of movement. In the present case, this is obtained by having a long coil and a cylindrical armature, in which the armature is long enough so that its critical movement takes place when the armature is below the top of the coil.

In Fig. 3, the wiring hookup is shown. A transformer 55 has a primary 56 connected across power lines 57 and 58, which may be controlled by a master switch 59. This transformer has a first secondary coil 60, a second secondary coil 61, and a third secondary coil 62. The secondary 60 has a lead 65 extending to a junction point with a line 66. This line leads through the terminals of the indicator 14, and thence to a junction with the lead 45 from the coil and armature assembly. This entire coil and assembly may be generally designated as M. The other lead 46 of the coil is connected by a wire 67 to a junction point of a resistor R1. The other end of this resistor is connected to a wire 68 that, in turn, is connected to a wire 69 that leads back to the secondary. The indicator 14 is conventionally connected to receive current variations through the foregoing circuit, which vary with the position of the armature in the coil, as will appear. The indicator thereby registers the position of the float 30.

The wire 67, at the upper end of the resistor R1, is likewise connected by a wire 72 to the cathode 73 of a tube 74. This tube may conveniently be a 6H6 type of tube. The cathode 73 is associated with a plate 76 that is connected by a wire 77 that leads to one end of a resistor R2, the other end of which is connected to the line 68 and one end of the resistor R1.

A capacitor 79 is connected across the resistor R2 between the wires 77 and 69. The wire 77 leads also through a resistor R3, a resistor R4 to a grid 81 of a tube 82 that may be of the 2050 type. A capacitor 83 and resistor R5 are connected to ground and disposed in series into the line 77 between the resistors R3 and R4.

Returning to the line 65 leading from the secondary 60, this line is connected with a line 85 that leads to a second cathode 86 in the tube 74. This cathode is associated with a second plate 87 that is connected by a wire 88 that leads to a wire 89 entering a resistance group R6, R7 and R8. The other end of this resistance group is connected to a wire 90 that leads back to the wire 69 at its junction with the wire 68, and thence back to the secondary 60. A filter capacitor 91 is connected across the resistance group R6, R7 and R8 between the wires 89 and 90.

An adjustable divider arm 93 is movable across the resistor R7 and is connected to ground.

A cathode 94 of the second tube 82 is connected to ground. This tube has a plate 95. This plate 95 is connected by a wire 96 that leads through a relay coil 97, the other end of which is connected by a wire 98 to one end of the secondary 62. The other end of this secondary is connected by a wire 99 to ground. A resistance-capacitance group including a capacitor 100 and a resistor R9 in series is connected across the coil 97.

The secondary 62 is likewise connected by a wire 102 through a resistor R10 and capacitor 103 to the line 45 at its junction with the line 66 to furnish a feed-back connection.

The coil 97, which as is evident, is on the output side of the tube 82, operates a relay having actuated blades 107 and 108. In their normal or released positions, the two blades 107 and 108 make contact with blades 120 and 115, respectively. When the coil 97 is adequately energized, these blades 107 and 108 make contact with blades 109 and 117, respectively.

The blade 107 is adapted to close with a contact 109. This contact is formed on a switch blade that is connected by a wire 110 to the junction of the wires 88 and 89, the latter of which is connected into the resistance group R6, R7 and R8 and the divider arm 93. The blade 107 is connected by a wire 111 to all of a group of resistors R11, R12, R13, R14, R15 and R16. These resistors have contacts at their other ends that are adapted to be engaged by a grounded contact 112 which may be closed with the end of any chosen one of the resistance group. As will appear, this resistance group R11 through R16 typifies a variable resistance which, as is obvious, may be a single variable divider of the type indicated at 93.

The switch blade 108 is here shown as single-pole, double-throw. When released, it is engaged with a contact 115 that is contacted to a wire 116. When energized, the blade 108 closes with the contact 117 that is connected to a wire 118. The blade 108 is itself connected to a wire 119. These three wires are connected in conventional fashion through the cable to the valve 15. This valve typifies the actuated means with which the present mechanism may work.

The secondary 61 has one side grounded at 99. Its other side X is connected directly with the ends, also marked X, of heaters for the three filaments. Each filament is grounded at its other end.

Referring back to Fig. 1, the control box 13 contains the various parts of the described mechanism exclusive of the sensitive mechanism 12, the gauge or indicator 14, and the valve 15. The knob indicated at 93 is the adjustable divider connected into the resistance group R6, R7 and R8, and the knob 112 is the lead 112 connectable with the resistance group R11 through R16. The valve 15 is operated toward closed position when the wires 116 and 119 are closed through contact of the blade 108 and the contact 115. The valve is opened by breaking of the foregoing circuit, and connection of the wires 119 and 118 through engagement of the blade 108 with the contact 117. The valve may typically be a magnetic valve having two coils, one for opening and one for closing; or it may be operated by a reversible motor.

*Operation*

With the float 30 in any particular position, the coil 40 will have a certain impedance. When the switch 59 is closed and the primary 56 of the transformer is energized, potential will be applied across the secondary 60. One lead 65 of this secondary extends through the line 66, the impedance M, the line 67 to one end of the resistor R1. There is a potential applied across the resistor R1 that produces current flow, this flow continuing through the lines 68 and 69 back to the secondary.

The potential drop across the resistor R1 is applied across one cathode-plate group of the tube 74. The circuit passes through the line 72 to the cathode 73, to the plate 76 and the line 77, to the resistor R2, and thence back to the line 68. This produces a rectified current flow through the resistor R2 and results in a potential drop across this resistor R2.

The potential drop across the resistor R2 is likewise applied across the grid-cathode 81—94 of the tube 82, thence to ground and back through the divider 93 to the balance of the resistor group R7 and R8 and the line 90 to the other end of the resistor R2. This potential is smoothed out by the capacitor 79.

Another potential is applied to the grid 81. This is derived from the other cathode-plate group of the tube 74. It will be remembered that the secondary 60 is connected by the line 65 through the line 85 to the cathode 86 of this tube. The circuit is continued via the plate 87 and the lines 88 and 89 into the resistance group R6, R7 and R8. It returns by the lines 90 and 69 to the secondary. However, the divider 93 is connected into the resistor R7, and this divider is connected through ground with the cathode 94 of the tube 82. The grid 81 of the tube 82 is likewise connected to the line 69. Hence, there is a rectified potential derived from this circuit applied to the grid 81, which potential consists of the voltage drop across the remainder of the resistor R7 and the resistor R8 between the divider 93 and the line 90. This potential is adjustable by varying the position of the divider 93.

Both of the foregoing rectified potentials are supplied by the tube 74. In addition, there is an alternating potential applied to the grid 81 by the feed-back circuit. The feed-back line 102 leads from the secondary 62 through the resistor R10 and the condenser 103, and may return through the coil 40 and the resistors R1 and R2 to the grid. The condenser 103 regulates the phase of this potential relative to the conducting cathode-plate potential across the tube 82, and, as will appear, assures the firing of the tube 82 at the proper point in its cycle.

As already noted, the adjustment of the divider arm 93 regulates the potential on the grid 81 of the tube 82. The potential on the grid 81 is likewise a function of the drop across R1. This latter, in turn, is a function of the impedance M of the coil assembly, which, in turn, is a function of the position of the float 30. Hence, a given adjustment of the divider 93 will determine what position of the float 30 in the coil 40 will produce the proper impedance condition to effect the desired net potential on the grid 81 to cause the tube 82 to become conducting.

Assuming that the tube 82 has become conducting, the relay coil 97 will be energized. This will cause the two blades 107 and 108 to contact blades 109 and 117, respectively. This will cause the electrical level-restoring device previously mentioned to function in the required manner. When the blade 107 contacts blade 109, it introduces a new factor in the determination of the potential on the grid 81, because it introduces a suitable one of the resistance group R11 through R16 in parallel with the resistor R6 and the first part of the resistance R7 up to the divider 93, and thereby changes the potential drop across the remainder of the resistor R7 and the resistor R8. The particular position of the arm 112 with a chosen one of the resistance group R11 through R16 determines the amount of this change in potential drop. By this means, a different potential is applied to the grid 81 of the tube 82 after this tube becomes conducting. As a result of this, the float 30 must move to a different position to render the tube non-conducting from the position at which it caused the tube to become conducting. Or, assuming a differential in the tube due to its inherent characteristics, this differential is variable by adjusting the knob 112 with respect to the resistances R11 through R16. By this means, a variable differential may be obtained. Furthermore, this differential is adjustable externally of the control mechanism itself, and may be physically widely separated therefrom, as desired.

It will be seen, therefore, that the arm 93 is adjustable to select the particular elevation of the float 30 at which the tube 82 becomes conducting and the relay 97 is energized; whereas the knob 112 may be adjusted to determine the position of the float 30 at which the tube thereafter becomes non-conducting and the relay coil 97 deenergized for the operation of the valve.

A consideration of the wiring diagram will show that the potential applied to the grid 81 consists of a rectified potential across a part of the resistance R7 and the resistance R8, a rectification voltage across the resistor R2, and a feed-back alternating voltage derived from the transformer secondary 62, flowing through the resistor R10 and the capacitor 103.

The rectification voltage across the resistor R2 is a unidirectional voltage opposite in polarity to the voltage across the resistor group R7 and R8, plus an alternating voltage of which the magnitude and wave form are determined by the values of the resistor R2 and the capacitor 79. The capacitor 79 smooths or filters that rectified potential supplied by the cathode-plate combination 73 and 76.

The function of the potential derived from the resistor R2 is to vary the grid potential in accordance with the position of the float, because the voltage drop across R2 varies as a function of the position of the float. The function of the voltage drop across the resistance group R7 and R8 is to afford a means to adjust the point at which the tube 82 becomes conducting and the actuated means 97 may be operated. The function of the resistance group R11 through R16 is to alter this last-named potential applied to the grid 81 after the actuated means 97 has been operated, so that the point at which the tube will become non-conducting may be adjusted at will. The result of this latter is, of course, to change the differential of operation of the valve.

The function of the potential applied to the grid 81 by the feed-back circuit is to insure the delivery of proper energy to the coil 97. This energy is a function of the point in the cycle between cathode and plate of the tube 82, at which it becomes conducting. Since this latter is determined by the secondary 62, and since also the feed-back circuit is phased from the secondary 62, this feed-back potential has its phase controllably adjusted with respect to the conductivity phase through the tube 82. In the practical application of the apparatus, the potential applied to the grid 81 by the feed-back will be substantially 90° ahead of the cathode-plate potential applied to the tube and will insure that the tube will become conducting at the beginning of the half cycle through the cathode-plate circuit.

If it is desired to change the position of the float at which the valve will be operated, the divider arm 93 will be moved. If this arm is moved in the direction to reduce the potential drop applied to the grid 81 by this resistance group, then a smaller potential drop must be supplied across the resistor R2 in order to make the tube 82 conducting. This will require the float 30 to rise further than it did before in order to produce conduction through the tube 82. Movement of the arm 93 in the opposite direction produces the opposite effect.

The change of the arm 112 on the resistance group R11 through R16 increases the voltage drop across the remainder of R7 and R8 by a variable amount. As the arm 112 is displaced from R16 toward R11, the voltage drop across R7 and R8 increases. This spreads the differential of operation of the valve, because it requires the float 30 to withdraw its armature further than before in order to reduce the grid potential on the grid 81 below that at which the tube 82 becomes conducting.

The capacitor 91 is a filtering capacitor used in its conventional manner, tending to even the potential across the resistance group R6, R7 and R8. The resistors R3 and R4, along with the resistor R5 and capacitor 83, are used for isolating purposes for the stabilization of the tube 82. The resistor R9 and the capacitor 100 are used to stabilize the action of the relay coil 97 and reduce chattering thereof.

It will be seen that a control arrangement has been provided that attains the objectives set forth. In particular, it may be seen that great flexibility is obtained by this mechanism, without resort to oscillatory, resonant, or bridge network connections. Likewise, the arrangement is relatively free of variations in supply voltage.

What is claimed is:

1. A control mechanism including an electronic tube having a cathode, grid means, and a plate, means interconnecting the cathode and the grid externally of the tube, circuit means for applying an operating potential across the cathode and plate, a sensitive element adapted to produce a varying potential drop in response to variations in a predetermined physical condition, alternating potential producing means, a circuit having the sensitive element therein and having a resistance therein, the circuit being connected across the potential producing means, a circuit across the resistance including a rectifier and a second resistance, means connecting the second resistance between the grid means and cathode, an additional circuit across the potential producing means, including a rectifier and a third resistance in series, means connecting variable amounts of said third resistance between the grid means and the cathode to apply a potential to the grid means of polarity opposite to that derived from the second resistance, whereby, when the grid potential derived from the third resistance is varied, the potential derived from the second resistance must be varied to attain a given net grid potential, capable of causing the tube to conduct, and means operated when the tube becomes conductive, to vary the potential applied between the grid means and the cathode.

2. A control mechanism including an electronic tube having a cathode, grid means, and a plate, means interconnecting the cathode and the grid externally of the tube, circuit means including switch means, for applying an operating potential across the cathode and plate, a sensitive element adapted to produce a varying potential drop in response to variations in a predetermined physical condition, alternating potential producing means, a circuit having the sensitive element therein and having a resistance therein, the circuit being connected across the potential producing means, a circuit across the resistance including a rectifier and a second resistance, means connecting the second resistance between the grid means and the cathode, an additional circuit across the potential producing means, including a rectifier and a third resistance in series, means connecting variable amounts of said third resistance between the grid means and the cathode to apply a potential to the grid means of polarity opposite to that derived from the second resistance, whereby, when the grid potential derived from the third resistance is varied, the potential derived from the second resistance must be varied to attain a given net grid potential, capable of causing the tube to conduct sufficiently to effect operation of the switch means, and means operated when the tube becomes conductive, to vary the potential applied between the grid means and the cathode, comprising an additional resistance connected by operation of the switch means to change the potential drop across the third resistance.

3. A control comprising an electronic tube having a cathode, grid means and a plate, circuit means applying a potential across the cathode and plate and energized when the tube is conductive, the tube being conductive only when the grid means carries adequate bias, a sensitive element comprising a float, an armature operated by the float, a coil associated with the armature, the coil and armature being characterized to produce changes in impedance of the coil with changes in position of the armature, a source of alternating potential, a first rectifier and a first resistor connected in series across the potential source, a second resistor, the coil and second resistor being connected across the potential source, a second rectifier and a third resistor connected across the second resistor, the cathode being connected to a selectable part of the first resistor and the grid being connected to the circuit between the second rectifier and third resistor, a feed-back circuit including a fourth resistor and a capacitor connected between the plate of the tube and a point between the coil and its source of potential, a switch closed upon conduction of the tube, a fifth and variable resistor, circuit means from between the first rectifier and first resistance through the switch and the fifth resistor to the point of connection between the first rectifier and the first resistor.

4. A control mechanism including an electronic tube having a cathode, grid means and a plate, means applying an alternating operating potential across the cathode and plate including an output circuit, a sensitive element automatically operable to produce a varying potential drop in response to changes in predetermined physical conditions, means to apply a unidirectional potential between the grid means and the cathode that varies with the potential drop of the sensitive element, selectively variable potential drop producing means, means applying a second unidirectional potential between the grid means and the cathode that varies with the potential drop produced by said selectively variable means, whereby variation of said selectively variable means will regulate the potential on the grid means and vary the potential drop required of the sensitive element to render the tube conductive, a common source for said two potentials, said means applying said potentials between the grid and the cathode being connected with said source to cause said potentials to be applied in opposite directions whereby the resultant grid potential from them is the difference between the two, said operating potential means comprising an output branch connected to an alternating potential source, and means applying an alternating potential between the grid means and the cathode in addition to said two unidirectional potentials, which alternating grid potential has a predetermined phase relationship to the alternating operating potential, said means applying the alternating grid potential to the grid means comprising circuit branch connections connected from the same alternating source as the operating potential, and phase changing means in one of said alternating potential branches to produce a predetermined phase relationship between the two alternating potentials.

5. In a control mechanism, an electronic tube having a plate and cathode circuit, and grid means, the tube being conductive to energize the plate and cathode circuit when a predetermined grid potential is applied between the grid means and the cathode, and being rendered non-conductive when the grid potential is thereafter changed, a sensitive element movable in response to changes in physical conditions, circuit means to produce a net grid potential that varies with movement of the sensitive element and has a value that is a function of the position thereof, whereby the tube may become conductive when the sensitive element reaches a predetermined position, and means to vary the grid potential when the plate circuit is energized, to vary the position of the sensitive element at which the plate circuit becomes non-conducting.

6. In a control mechanism, an electronic tube having a plate and cathode circuit, and grid means, the tube being conductive to energize the plate circuit when a predetermined grid potential is applied between the grid means and the cathode, and being rendered non-conductive when the grid potential is thereafter changed, a sensitive element movable in response to changes in physical conditions, circuit means to produce a net grid potential that varies with movement of the sensitive element and has a value that is a function of the position thereof, whereby the tube may become conductive when the sensitive element reaches a predetermined position, and means to vary the grid potential when the plate circuit is energized, to vary the position of the sensitive element at which the plate circuit becomes non-conducting, said last recited means to vary the grid potential comprising a circuit branch rendered effective upon conduction of the tube to alter the voltage drop in the grid circuit means.

7. A control mechanism including an electronic tube having a plate, a cathode, and a grid connected with the cathode through a circuit external of the tube; means for providing an alternating potential across the cathode and plate; a sensitive element for automatically producing a range of variable potentials in response to variations in a selected physical condition; means for continuously applying a first potential between the grid and the cathode that varies in response to variations in the potential produced by the sensitive element; means for continuously applying a second potential between the grid and the cathode opposite to the first potential including selectively variable means to produce a predetermined potential; and means comprising an alternating potential circuit containing a phase shifter, the grid, and the cathode, to cause the tube to become conducting near the beginning of the alternating potential cycle applied across the cathode and plate when the net potential provided by the first and second potential attains a predetermined value.

8. A control mechanism including an electronic tube having a plate, a cathode, and a grid connected with the cathode through a circuit external of the tube; a circuit external of the tube connecting the cathode and the plate; a sensitive element for automatically producing a range of variable potentials in response to variations in a selected physical condition; means for continuously applying a first variable potential between the grid and the cathode that varies in response to variations in the potential produced by the sensitive element; means for continuously applying a second potential between the grid and the cathode opposite to the first potential; a relay in the plate-cathode circuit; and circuit means including the relay contacts and an adjustable resistor, the circuit means being operated by actuation of the relay and interconnected with the means continuously applying the second potential to the grid and cathode, to automatically change the magnitude of the second potential.

9. A control mechanism, comprising an electronic tube having a plate, a cathode, and a grid; a grid-cathode circuit external of the tube; a sensitive element movable in response to changes in physical conditions; circuit means to produce a net potential between the grid and the cathode that varies with movement of the sensitive element and has a value that is a function of the position thereof, the tube changing between a conducting condition and a non-conducting condition when the sensitive element reaches a first position; and means responsive to the change in tube current between conduction and non-conduction conditions changing the net grid potential, to change the position of the sensitive element required to change the tube back to the other condition.

10. A control mechanism, comprising an electronic tube having a plate, a cathode, and a grid; a grid-cathode circuit external of the tube; a sensitive element movable in response to changes in physical conditions; circuit means to produce a net potential between the grid and the cathode that varies with movement of the sensitive element and has a value that is a function of the position thereof, the tube changing between a conducting condition and a non-conducting condition when the sensitive element reaches a first position; and means responsive to the change of the tube from one condition to the other condition caused by the sensitive element attaining said first position, to change the position of the sensitive element required to change the tube back to the other condition.

11. A control mechanism including an electronic tube having a cathode, grid means, and a plate; means interconnecting the cathode and the grid externally of the tube; circuit means for applying an operating potential across the cathode and plate; a sensitive element adapted to produce a varying potential drop in response to variations in a predetermined physical condition; alternating potential producing means; a circuit having the sensitive element therein and having a resistance therein, the circuit being connected across the potential producing means; a circuit connected in parallel with the resistance and including a rectifier and a second resistance; means connecting the second resistance in parallel with the grid means and cathode; an additional circuit across the potential producing means, including a rectifier and a third resistance in series; and means connecting variable amounts of said third resistance in parallel with the grid means and the cathode to apply a potential to the grid means of polarity opposite to that derived from the second resistance.

12. A control mechanism including an electronic tube having a cathode, grid means, and a plate; means interconnecting the cathode and the grid externally of the tube; circuit means for applying an operating potential across the cathode and plate; a sensitive element adapted to produce a varying potential drop in response to variations in a predetermined physical condition; alternating potential producing means; a circuit having the sensitive element therein and having a resistance therein, the circuit being connected across the potential producing means; a circuit connected between the sensitive element and the resistance and including a rectifier and a second resistance; means connecting the second resistance between the grid means and cathode; an additional circuit across the potential producing means, including a rectifier and a third resistance in series; means connecting variable amounts of said third resistance between the grid means and the cathode to apply a potential to the grid means of polarity opposite to that derived from the second resistance; and means responsive to the change in tube current between conduction and non-conduction conditions for changing the current through the third resistance so as to vary the potential derived from it.

DOUGLAS K. McILVAINE.
WILLIAM P. MYERS, Jr.

REFERENCES CITED

The following references are of record in the file of this patent:

UNITED STATES PATENTS

| Number | Name | Date |
|---|---|---|
| 2,119,061 | Stein | May 31, 1938 |
| 2,120,048 | Turner | June 7, 1938 |
| 2,144,668 | Stoessel | Jan. 24, 1939 |
| 2,150,265 | Conover | Mar. 14, 1939 |
| 2,162,859 | Pelikan | June 20, 1939 |
| 2,224,119 | Harrison | Dec. 3, 1940 |
| 2,310,298 | Kuhl | Feb. 9, 1943 |
| 2,323,128 | Hare | June 29, 1943 |
| 2,348,177 | Keeler | May 2, 1944 |
| 2,389,458 | Preston | Nov. 20, 1945 |
| 2,433,599 | Cohen | Dec. 30, 1947 |
| 2,455,350 | Beam | Dec. 7, 1948 |